(12) United States Patent
Shiomi et al.

(10) Patent No.: US 11,815,425 B2
(45) Date of Patent: Nov. 14, 2023

(54) JIG FOR VIBRATION TEST OF ROTOR BLADE

(71) Applicant: IHI CORPORATION, Tokyo (JP)

(72) Inventors: Kensuke Shiomi, Tokyo (JP); Kosuke Iwamoto, Tokyo (JP); Teruyoshi Otoyo, Tokyo (JP); Takashi Mori, Tokyo (JP); Takaomi Inada, Tokyo (JP)

(73) Assignee: IHI CORPORATION, Tokyo (JP)

( * ) Notice: Subject to any disclaimer, the term of this patent is extended or adjusted under 35 U.S.C. 154(b) by 115 days.

(21) Appl. No.: 17/450,475

(22) Filed: Oct. 11, 2021

(65) Prior Publication Data

US 2022/0026310 A1 Jan. 27, 2022

Related U.S. Application Data

(63) Continuation of application No. PCT/JP2020/004942, filed on Feb. 7, 2020.

(30) Foreign Application Priority Data

Apr. 12, 2019 (JP) ................................. 2019-076436

(51) Int. Cl.
*G01M 15/14* (2006.01)
*F01D 5/26* (2006.01)
(Continued)

(52) U.S. Cl.
CPC ............... *G01M 15/14* (2013.01); *F01D 5/26* (2013.01); *F01D 5/30* (2013.01); *G01M 7/027* (2013.01)

(58) Field of Classification Search
CPC ......... G01M 7/027; G01M 15/14; F01D 5/26; F01D 5/30
See application file for complete search history.

(56) References Cited

U.S. PATENT DOCUMENTS 3,690,160 A * 9/1972 Kriesten ............... G01M 13/00
73/837
8,650,961 B2 2/2014 Hanoomanjee et al.
(Continued)

FOREIGN PATENT DOCUMENTS

CN 206710048 U 12/2017
CN 108519204 A 9/2018
(Continued)

OTHER PUBLICATIONS

International Search Report dated Apr. 14, 2020 in PCT/JP2020/004942 filed on Feb. 7, 2020, 3 pages.

*Primary Examiner* — Eric S. McCall
(74) *Attorney, Agent, or Firm* — Oblon, McClelland, Maier & Neustadt, L.L.P.

(57) ABSTRACT

Provided is a jig for a vibration test of a rotor blade, for use in the vibration test for evaluating high cycle fatigue characteristics of the rotor blade for an aircraft engine, and the jig is provided with a jig body holding a dovetail portion of a fan blade and fixed onto an excitation table of a shaker, and a hydraulic jack that applies a load in a blade span direction to the fan blade to fix the fan blade to the jig body. Consequently, in the vibration test for evaluating the high cycle fatigue characteristics of the rotor blade, a test simulating an actual operation state can be carried out, the rotor blade can be efficiently excited to reach a large deformation region, and high cycle fatigue failure can occur without any increase in test cost.

9 Claims, 7 Drawing Sheets

(51) Int. Cl.
  *F01D 5/30* (2006.01)
  *G01M 7/02* (2006.01)

(56) References Cited

U.S. PATENT DOCUMENTS

| | | | | |
|---|---|---|---|---|
| 2005/0268728 | A1* | 12/2005 | Phipps | G01N 3/04 73/826 |
| 2009/0151458 | A1* | 6/2009 | Yoon | G01N 29/225 73/639 |
| 2011/0000308 | A1* | 1/2011 | Bassot | G01N 3/56 73/826 |
| 2014/0115892 | A1* | 5/2014 | Bezdecny | G01M 13/00 29/889.721 |
| 2015/0153310 | A1* | 6/2015 | Yamamoto | G01N 29/262 73/627 |
| 2019/0094104 | A1* | 3/2019 | Penn | G01M 5/0075 |
| 2019/0234828 | A1* | 8/2019 | Valdez | G01N 3/20 |
| 2019/0314942 | A1* | 10/2019 | Lin | B23Q 3/063 |
| 2020/0003654 | A1* | 1/2020 | Huot | G01M 7/08 |
| 2020/0011760 | A1* | 1/2020 | Richards | G01M 5/0075 |
| 2020/0209100 | A1* | 7/2020 | Christiansen | G01M 5/0016 |
| 2021/0108619 | A1* | 4/2021 | Christiansen | F03D 17/00 |
| 2021/0215644 | A1* | 7/2021 | Christiansen | G01N 29/12 |
| 2021/0396155 | A1* | 12/2021 | Shiomi | G01N 3/34 |
| 2022/0010780 | A1* | 1/2022 | Batge | F03D 13/30 |
| 2022/0090991 | A1* | 3/2022 | Biesinger | G01N 1/04 |
| 2023/0055216 | A1* | 2/2023 | Van Beveren | F03D 17/00 |
| 2023/0060931 | A1* | 3/2023 | Rosemeier | G01M 7/04 |

FOREIGN PATENT DOCUMENTS

| | | |
|---|---|---|
| EP | 3 121 586 A1 | 1/2017 |
| JP | 05-142130 A | 6/1993 |
| JP | 06-017604 A | 1/1994 |
| JP | 10-253490 A | 9/1998 |
| JP | 2000-356565 A | 12/2000 |
| JP | 2002-257672 A | 9/2002 |
| JP | 2003-227774 A | 8/2003 |
| JP | 2003-270081 A | 9/2003 |
| JP | 2004-077163 A | 3/2004 |
| JP | 2004-117323 A | 4/2004 |
| JP | 2004-271475 A | 9/2004 |
| JP | 5556678 B2 | 7/2014 |
| JP | 2015-028340 A | 2/2015 |
| JP | 6142074 B2 | 6/2017 |
| JP | 2018-179616 A | 11/2018 |
| JP | 2019-196965 A | 11/2019 |

* cited by examiner

JIG FOR VIBRATION TEST OF ROTOR BLADE

TECHNICAL FIELD

Embodiments described herein relate to a jig for a vibration test of a rotor blade, that is suitable for use in performing the vibration test of the rotor blade for an aircraft engine.

BACKGROUND ART

The above vibration test of the rotor blade for the aircraft engine is a test to be carried out for evaluating high cycle fatigue characteristics. In a background art, as a device for this vibration test of the rotor blade, for example, a fatigue testing device described in Patent Document 1 is known.

This fatigue testing device is provided with a fixing jig to which a dovetail portion (a dovetail-shaped blade root end portion) of the rotor blade is fixed, and a pulse generator. In this fatigue testing device, the pulse generator generates pulses so that pulsed air continuously collides with a blade surface of the rotor blade (spot vibration) fixed to the fixing jig, and the rotor blade is excited.

RELATED ART DOCUMENT

Patent Document

Patent Document 1: Japanese Patent No. 5556678

SUMMARY OF THE DISCLOSURE

Problems to be Solved by the Disclosure

In the above fatigue testing device, as a deformation amount of the rotor blade receiving pulsed air increases, air cannot be applied perpendicularly to a blade surface, and the rotor blade cannot be excited at a large amplitude. Therefore, high cycle fatigue failure might not occur and a test might fail.

Furthermore, it is needed in a vibration test of a rotor blade for an aircraft engine that, to highly precisely evaluate high cycle fatigue characteristics, a load (an operating load) equivalent to a centrifugal force applied to a dovetail portion by rotation of the engine is applied to carry out the test, and it has conventionally been attempted to solve the above problems and to perform the vibration test of the rotor blade while simulating an operation state.

An object of the present disclosure, which has been developed to solve such conventional problems as described above, is to provide a jig for a vibration test of a rotor blade, capable of carrying out the test simulating an actual operation state, and additionally efficiently vibrating the rotor blade to reach a large deformation region where high cycle fatigue failure occurs, when performing the vibration test for evaluating high cycle fatigue characteristics of the rotor blade.

Means for Solving the Problems

A first aspect of the present disclosure is directed to a jig for a vibration test of a rotor blade, for use in the vibration test for evaluating high cycle fatigue characteristics of the rotor blade, and the jig is provided with a jig body holding a dovetail portion of the rotor blade and fixed onto an excitation table of a shaker, and a force applying section that applies a load in a span direction to the dovetail portion of the rotor blade to fix the rotor blade to the jig body.

When performing the vibration test for evaluating the high cycle fatigue characteristics of the rotor blade by use of the jig for the vibration test of the rotor blade of the present disclosure, first, the force applying section is connected to the dovetail portion of the rotor blade held by the jig body, so that the load can be applied.

Secondly, the jig body holding the rotor blade is fixed onto the excitation table of the shaker. Subsequently, the force applying section applies, to the dovetail portion of the rotor blade, the load equivalent to a centrifugal force in the span direction to fix the rotor blade to the jig body.

Next, when the rotor blade, the force applying section and the jig body on the excitation table are excited collectively by the shaker in a state where the above load is applied to the dovetail portion of the rotor blade by the force applying section, the rotor blade may be excited while leaving the load simulating an actual operation state applied onto the dovetail portion of the rotor blade.

In the jig for the vibration test of the rotor blade of the present disclosure, the excitation table of the shaker is noticeably excited, and thereby, the rotor blade may be excited at a large amplitude. Consequently, the rotor blade may be efficiently excited to reach a large deformation region where high cycle fatigue failure occurs.

Effects of the Disclosure

A jig for a vibration test of a rotor blade according to the present disclosure produces excellent effects that the test simulating an actual operation state can be carried out and that the rotor blade can be efficiently excited to reach a large deformation region where high cycle fatigue failure occurs, in a case of performing the vibration test for evaluating high cycle fatigue characteristics of the rotor blade.

MODE FOR CARRYING OUT THE DISCLOSURE

Hereinafter, embodiments of the present disclosure will be described with reference to drawings.

Figure 1:
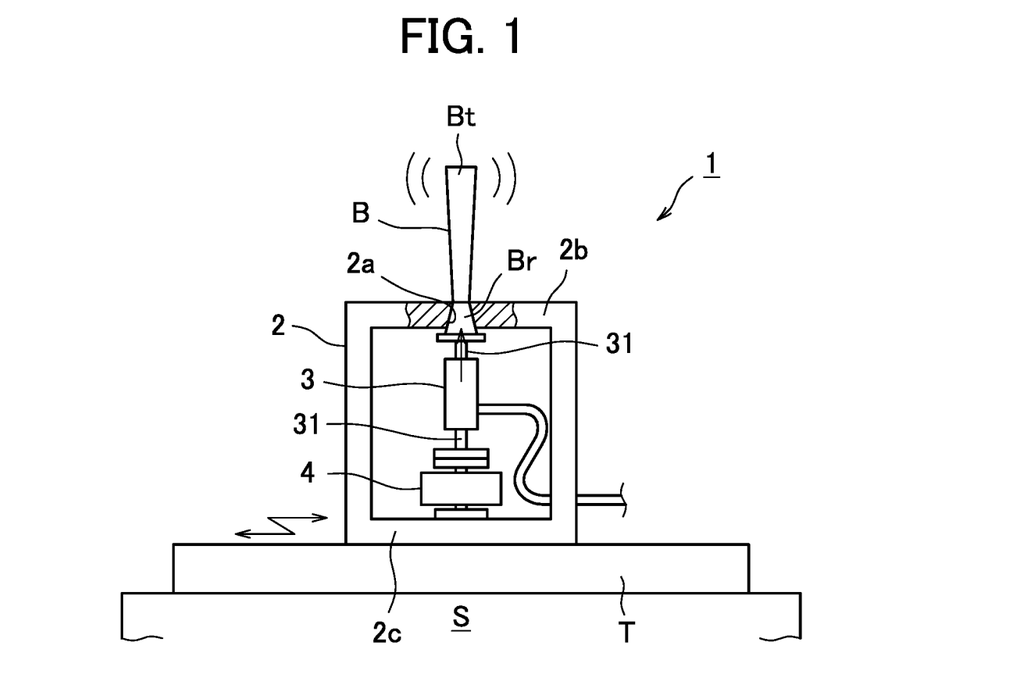
FIG. 1 is a front explanatory view showing a situation where a vibration test of a rotor blade is performed by using a jig for the vibration test of the rotor blade according to an embodiment of the present disclosure.

FIG. 1 shows a jig for a vibration test of a rotor blade according to an embodiment of the present disclosure. This embodiment illustrates a case where the jig for the vibration test of the rotor blade according to the present disclosure is the jig for the vibration test, for use in the vibration test for evaluating high cycle fatigue characteristics of a fan blade (a fan rotor blade) for an aircraft engine.

As shown in FIG. 1, a jig 1 for the vibration test of the rotor blade is provided with a jig body 2 holding a fan blade B, a hydraulic jack (a force applying section) 3 that applies a load to the fan blade B to fix the fan blade B to the jig body 2, and a load cell (a load measuring section) 4 that measures the load applied from the hydraulic jack 3 to the fan blade B.

The jig body 2 is in a square tube shape surrounded with walls on top, bottom, right and left except front and rear (front and back of the drawing). The hydraulic jack 3 and the load cell 4 are housed one above the other in the jig body 2.

Furthermore, a holding groove 2a is formed in a top wall 2b of the jig body 2. A dovetail portion Br of the fan blade B with a blade tip Bt up is fitted from below into the holding groove 2a.

In this embodiment, first operation shaft 31 of the hydraulic jack 3 is connected to the dovetail portion Br of the fan blade B in the holding groove 2a, and second operation shaft 31 of the hydraulic jack 3 is connected to a bottom wall 2c of the jig body 2 via the load cell 4.

That is, the hydraulic jack 3 is operated in such a connected state, to fix the fan blade B to the jig body 2 while applying a force to the dovetail portion Br of the fan blade B in a direction of an arrow shown in the drawing, that is, applying, to the dovetail portion Br, a surface pressure due to a reaction force received from the jig body 2.

Then, in this embodiment, the jig body 2 to which the fan blade B is fixed as described above is mounted to an excitation table T that vibrates in a horizontal plane of an electromagnetic shaker S, when performing the vibration test for evaluating the high cycle fatigue characteristics.

Note that in a case of using the excitation table T that vibrates in a vertical direction, the test can be similarly performed by mounting the jig body 2 to the excitation table T so that a blade surface of the fan blade B faces a vibration direction of the excitation table T.

Furthermore, the jig body 2 may be mounted to the excitation table T by use of bolts provided on the table, or the like, and any special fixtures are not needed.

When performing the vibration test for evaluating the high cycle fatigue characteristics of the rotor blade by use of the jig 1 for the vibration test of the rotor blade according to this embodiment, first, the operation shaft 31 of the hydraulic jack 3 is connected to the dovetail portion Br of the fan blade B held in the holding groove 2a of the jig body 2, so that the load can be applied.

Secondly, the jig body 2 holding the fan blade B is fixed onto the excitation table T of the electromagnetic shaker S. Subsequently, the hydraulic jack 3 is operated to apply the load equivalent to a centrifugal force in a span direction to the dovetail portion Br of the fan blade B that is fitted into the holding groove 2a of the jig body 2, and thereby, the fan blade B is fixed to the jig body 2.

Next, when the fan blade B, the hydraulic jack 3 and the jig body 2 on the excitation table T are excited collectively in a horizontal direction by the electromagnetic shaker S in a state where the above load is applied to the dovetail portion Br of the fan blade B, the fan blade B may be excited while leaving the load simulating an actual operation state applied onto the dovetail portion Br of the fan blade B.

In the jig 1 for the vibration test of the rotor blade according to this embodiment, the excitation table T of the electromagnetic shaker S is noticeably excited, so that the fan blade B can be excited at a large amplitude. Consequently, the rotor blade can be efficiently excited to reach a large deformation region where high cycle fatigue failure occurs.

Further, in the jig 1 for the vibration test of the rotor blade according to this embodiment, the hydraulic jack 3 serving as the force applying section is placed in the jig body 2 without being connected to the excitation table T of the electromagnetic shaker S, and hence, the jig body 2 serves as an internal force system for the load applied to the dovetail portion Br. Therefore, damages on the electromagnetic shaker S and deformation of the excitation table T can be avoided.

Furthermore, the jig 1 for the vibration test of the rotor blade according to this embodiment is provided with the load cell 4 that measures the load applied from the hydraulic jack 3 to the dovetail portion Br of the fan blade B, and hence, it can be confirmed that the load simulating the actual operation state is applied to the dovetail portion Br.

Additionally, in the jig 1 for the vibration test of the rotor blade according to this embodiment, in the vibration test, a sensor for monitoring a blade deformation may be placed on the blade surface of the fan blade B, and hence, the test can be carried out while accurately grasping the deformation of the fan blade B.

Figure 2:
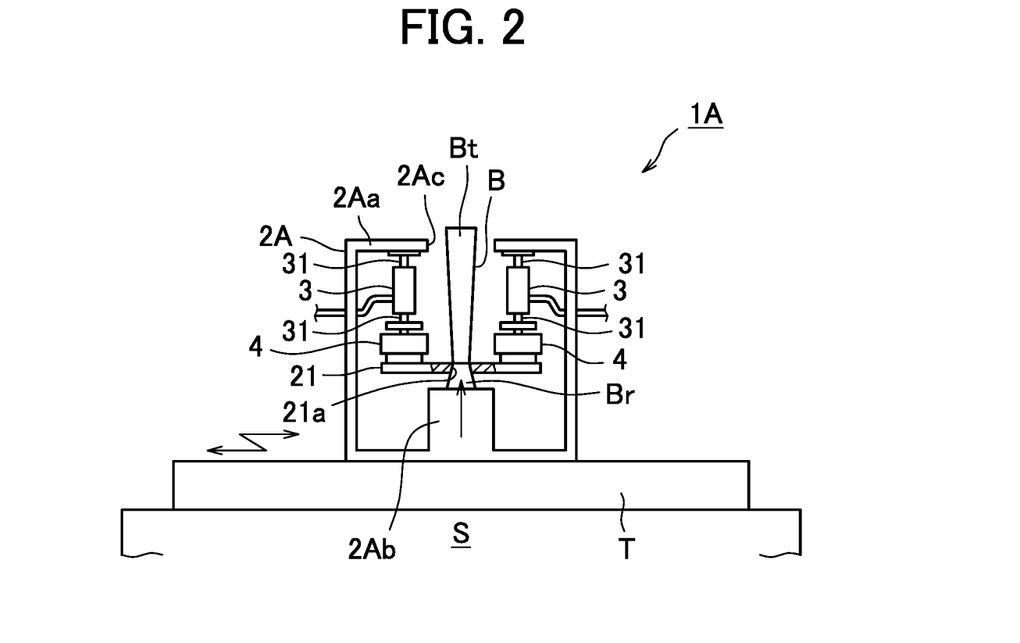
FIG. 2 is a front explanatory view showing a situation where the vibration test of the rotor blade is performed by using a jig for the vibration test of the rotor blade according to another embodiment of the present disclosure.

FIG. 2 shows a jig for a vibration test of a rotor blade according to another embodiment of the present disclosure. This embodiment also illustrates a case where the jig for the vibration test of the rotor blade according to the present disclosure is for use in the vibration test for evaluating high cycle fatigue characteristics of a fan blade (a fan rotor blade) for an aircraft engine.

As shown in FIG. 2, a jig 1A for the vibration test of the rotor blade is also provided with a jig body 2A holding a fan blade B, two hydraulic jacks (a force applying section) 3 that apply a load to the fan blade B to fix the fan blade B to the jig body 2A, and two load cells (a load measuring section) 4 that measure the load applied from the hydraulic jacks 3 to the fan blade B.

The jig body 2A also is in a square tube shape surrounded with walls on top, bottom, right and left except front and rear (front and back of the drawing). An opening 2Ac is formed in a top wall 2Aa, and a blade mount 2Ab is provided integrally in a bottom part.

Further, in the jig body 2A, a top plate 21 constituting the force applying section together with the hydraulic jacks 3 is housed. In the top plate 21, a holding groove 21a is formed into which a dovetail portion Br of the fan blade B with a blade tip Bt up is fitted from below.

In this embodiment, the fan blade B is mounted and held on the blade mount 2Ab. Then, the top plate 21 is set relative to the fan blade B on the blade mount 2Ab so that the dovetail portion Br is fitted into the holding groove 21a of the top plate.

Each of the two hydraulic jacks 3 and each of the two load cells 4 are placed one above the other on each of opposite sides of the fan blade B on the blade mount 2Ab in the jig body 2A. Then, first operation shaft 31 of each hydraulic jack 3 is connected to the top wall 2Aa of the jig body 2A, and second operation shaft 31 of each hydraulic jack 3 is connected to the top plate 21 via each load cell 4.

That is, each of the two hydraulic jacks 3 is operated in such a connected state, to fix the fan blade B to the jig body 2A while applying a force to the dovetail portion Br of the fan blade B in a direction of an arrow shown in the drawing, that is, applying, to the dovetail portion Br, a surface pressure due to a reaction force received from the top plate 21.

Then, in this embodiment, the jig body 2A to which the fan blade B is fixed as described above is mounted to an excitation table T that vibrates in a horizontal plane of an electromagnetic shaker S, when performing the vibration test for evaluating high cycle fatigue characteristics of the rotor blade.

Also, in this embodiment, in a case of using the excitation table T that vibrates in a vertical direction, the test can be similarly performed by mounting the jig body 2A to the excitation table T so that a blade surface of the fan blade B faces a vibration direction of the excitation table T.

When performing the vibration test for evaluating the high cycle fatigue characteristics of the rotor blade by use of the jig 1A for the vibration test of the rotor blade according to this embodiment, first, first operation shaft 31 of each hydraulic jack 3 is connected to the top wall 2Aa of the jig body 2A on each of the opposite sides of the fan blade B on the blade mount 2Ab of the jig body 2A. Secondly, second operation shaft 31 of each hydraulic jack 3 is connected to the top plate 21 via each load cell 4, so that the load can be applied to the fan blade B.

Then, the jig body 2A holding the fan blade B is fixed onto the excitation table T of the electromagnetic shaker S. Subsequently, the respective hydraulic jacks 3 on the opposite sides of the fan blade B are operated to apply the load equivalent to a centrifugal force in a span direction to the dovetail portion Br of the fan blade B that is fitted into the holding groove 21a of the top plate 21, and thereby, the fan blade B is fixed to the jig body 2A.

Next, when the fan blade B, the hydraulic jacks 3 and the jig body 2A on the excitation table T are excited collectively in a horizontal direction by the electromagnetic shaker S in a state where the above load is applied to the dovetail portion Br of the fan blade B, the fan blade B may be excited while leaving the load simulating an actual operation state applied onto the dovetail portion Br of the fan blade B.

Also, in the jig 1A for the vibration test of the rotor blade according to this embodiment, the fan blade B may be excited at a large amplitude by the excitation table T of the electromagnetic shaker S. Consequently, the rotor blade can be efficiently excited to reach a large deformation region where high cycle fatigue failure occurs.

Also, in the jig 1A for the vibration test of the rotor blade according to this embodiment, the hydraulic jacks 3 serving as the force applying section are placed in the jig body 2A, and hence, the jig body 2A serves as an internal force system for the load applied to the dovetail portion Br. As a result, damages on the electromagnetic shaker S and deformation of the excitation table T can be avoided.

Furthermore, the jig 1A for the vibration test of the rotor blade according to this embodiment is also provided with the load cells 4 that measure the load applied to the dovetail portion Br of the fan blade B, and hence, it can be confirmed that the load simulating the actual operation state is applied to the dovetail portion Br. Additionally, a sensor for monitoring a blade deformation may be placed on the blade surface of the fan blade B, and hence, the test can be carried out while accurately grasping the deformation of the fan blade B.

Figure 3:
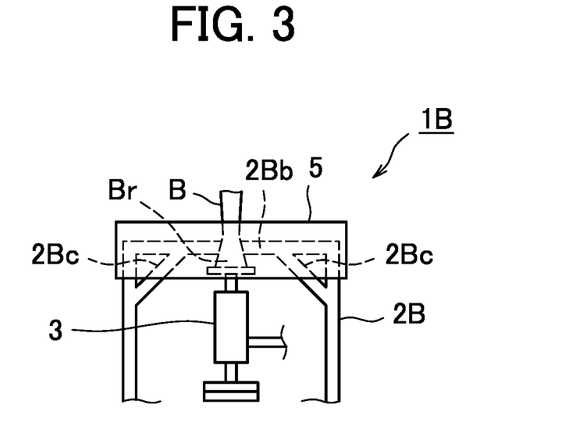
FIG. 3 is a partial front explanatory view showing a modification of the jig for the vibration test of the rotor blade in FIG. 1.

FIG. 3 shows a modification of the jig 1 for the vibration test of the rotor blade in the embodiment shown in FIG. 1. In a jig 1B for the vibration test of the rotor blade, an upper part of a jig body 2B has reinforcement ribs 2Bc integrally formed as reinforcement parts, and a reinforcement plate 5 similarly as a reinforcement part is placed on a top wall 2Bb of the jig body 2B. The other configuration is the same as in the jig 1 for the vibration test of the rotor blade in the previous embodiment.

In the jig 1B for the vibration test of the rotor blade in this embodiment, the jig body 2B can be prevented from being deformed when operating a hydraulic jack 3 to apply a load to a dovetail portion Br of a fan blade B in the jig body 2B.

Figure 4:
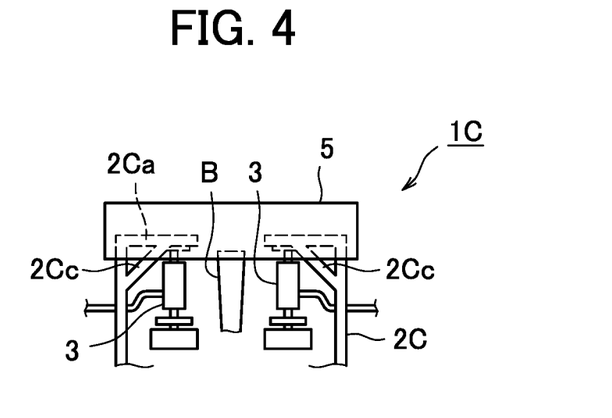
FIG. 4 is a partial front explanatory view showing a modification of the jig for the vibration test of the rotor blade in FIG. 2.

FIG. 4 shows a modification of the jig 1A for the vibration test of the rotor blade in the embodiment shown in FIG. 2. In a jig 1C for the vibration test of the rotor blade, an upper part of a jig body 2C has reinforcement ribs 2Cc integrally formed as reinforcement parts, and a reinforcement plate 5 similarly as a reinforcement part is placed on a top wall 2Ca of the jig body 2C. The other configuration is the same as in the jig 1A for the vibration test of the rotor blade in the previous embodiment.

Also, in the jig 1C for the vibration test of the rotor blade in this embodiment, the jig body 2C can be prevented from being deformed when operating hydraulic jacks 3 to apply a load to a fan blade B in the jig body 2C.

Figure 5:
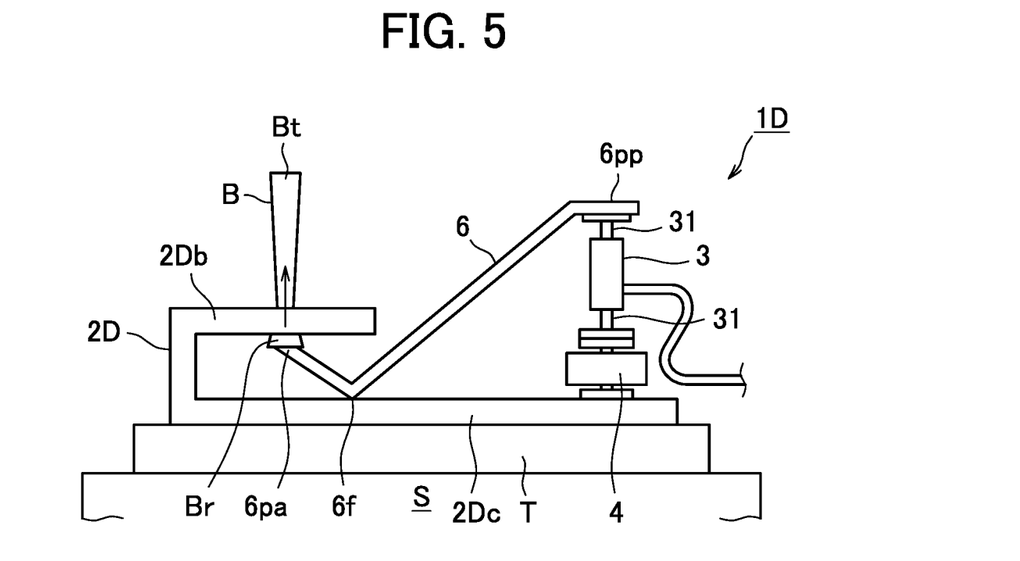
FIG. 5 is a front explanatory view showing a situation where the vibration test of the rotor blade is performed by using a jig for the vibration test of the rotor blade according to still another embodiment of the present disclosure.

FIG. 5 shows a jig for a vibration test of a rotor blade according to still another embodiment of the present disclosure. This embodiment also illustrates a case where the jig for the vibration test of the rotor blade according to the present disclosure is for use in the vibration test for evaluating high cycle fatigue characteristics of a fan blade (a fan rotor blade) for an aircraft engine.

As shown in FIG. 5, a jig 1D for the vibration test of the rotor blade is provided with a jig body 2D holding a fan blade B, a hydraulic jack (a force applying section) 3 that applies a load to the fan blade B to fix the fan blade B to the jig body 2D, and a load cell (a load measuring section) 4 that measures the load applied from the hydraulic jack 3 to the fan blade B. In this embodiment, the hydraulic jack 3 that can push and pull is adopted.

The jig body 2D is in a shape surrounded with walls on top, bottom and left except front and rear (front and back of the drawing) and one of right and left (right shown in the drawing). The hydraulic jack 3 and the load cell 4 are placed one above the other on a bottom extension 2Dc of the jig body 2D.

In this embodiment, the dovetail portion Br of the fan blade B with a blade tip Bt up is held in a top wall 2Db of the jig body 2D. Then, first operation shaft 31 of the hydraulic jack 3 is connected to the dovetail portion Br of the fan blade B via a lever 6, and second operation shaft 31 of the hydraulic jack 3 is connected to the bottom extension 2Dc of the jig body 2D via the load cell 4.

That is, a point of load $6pa$ of the lever 6 with a leverage point $6f$ placed on the bottom extension 2Dc of the jig body 2D is connected to the dovetail portion Br of the fan blade B, and a point of effort $6pp$ of the lever 6 is connected to one operation shaft 31 of the hydraulic jack 3. Additionally, a shaft pulling operation is performed by the hydraulic jack 3, and thereby, the fan blade B is fixed to the jig body 2D while applying a load to the dovetail portion Br of the fan blade B in a direction of an arrow shown in the drawing.

Then, in this embodiment, the jig body 2D to which the fan blade B is fixed as described above is mounted to an excitation table T that vibrates in a horizontal plane of an electromagnetic shaker S, and the vibration test for evaluating high cycle fatigue characteristics is performed.

Also, in this embodiment, in a case of using the excitation table T that vibrates in a vertical direction, the test can be similarly performed by mounting the jig body 2D to the excitation table T so that a blade surface of the fan blade B faces a vibration direction of the excitation table T.

When performing the vibration test for evaluating the high cycle fatigue characteristics of the rotor blade by use of the jig 1D for the vibration test of the rotor blade according to this embodiment, first, the operation shaft 31 of the hydraulic jack 3 is connected to the dovetail portion Br of the fan blade B held in the top wall 2Db of the jig body 2D via the lever 6, so that the load can be applied.

Secondly, the jig body 2D holding the fan blade B is fixed onto the excitation table T of the electromagnetic shaker S. Subsequently, the hydraulic jack 3 is operated to apply the load equivalent to a centrifugal force in a span direction to the dovetail portion Br of the fan blade B held in the top wall 2Db of the jig body 2D via the lever 6, and thereby, the fan blade B is fixed to the jig body 2D.

Then, the above load is applied to the dovetail portion Br of the fan blade B by the hydraulic jack 3. Then, in this state, when the fan blade B, the hydraulic jack 3 and the jig body 2D on the excitation table T are excited collectively in a horizontal direction by the electromagnetic shaker S, the fan blade B may be excited while leaving the load simulating an actual operation state applied onto the dovetail portion Br of the fan blade B.

Also, in the jig 1D for the vibration test of the rotor blade according to this embodiment, the excitation table T of the electromagnetic shaker S is noticeably excited, so that the fan blade B can be excited at a large amplitude. Consequently, the rotor blade can be efficiently excited to reach a large deformation region where high cycle fatigue failure occurs.

Further, in the jig 1D for the vibration test of the rotor blade according to this embodiment, the hydraulic jack 3 serving as the force applying section is placed on the bottom extension 2Dc of the jig body 2D without being connected to the excitation table T of the electromagnetic shaker S, and hence, the jig body 2 serves as an internal force system for the load applied to the dovetail portion Br. Therefore, damages on the electromagnetic shaker S and deformation of the excitation table T can be avoided.

Additionally, in the jig 1D for the vibration test of the rotor blade according to this embodiment, since the load is applied to the dovetail portion Br of the fan blade B via the lever 6 by the hydraulic jack 3, a small one may be adopted as the hydraulic jack 3.

Furthermore, since the jig 1D for the vibration test of the rotor blade according to this embodiment is also provided with the load cell 4 that measures the load from the hydraulic jack 3, it can be confirmed that the load simulating the actual operation state is applied to the dovetail portion Br.

Additionally, also, in the jig 1D for the vibration test of the rotor blade according to this embodiment, a sensor for monitoring a blade deformation may be placed on the blade surface of the fan blade B in the vibration test, and hence, the test can be carried out while accurately grasping the deformation of the fan blade B.

Figure 6:
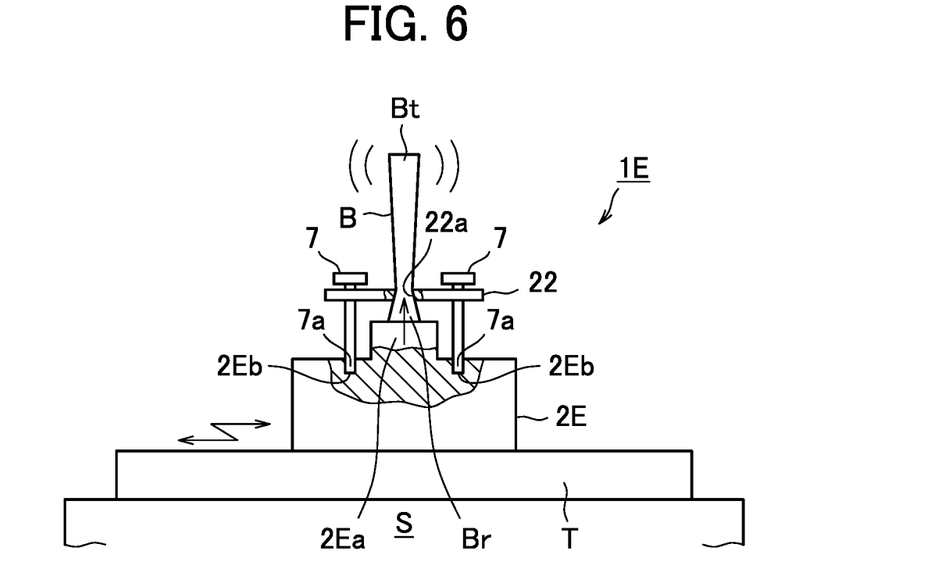
FIG. 6 is a front explanatory view showing a situation where the vibration test of the rotor blade is performed by using a jig for the vibration test of the rotor blade according to a still further embodiment of the present disclosure.

FIG. 6 shows a jig for a vibration test of a rotor blade according to a still further embodiment of the present disclosure. This embodiment also illustrates a case where the jig for the vibration test of the rotor blade according to the present disclosure is for use in the vibration test for evaluating high cycle fatigue characteristics of a fan blade (a fan rotor blade) for an aircraft engine.

As shown in FIG. 6, a jig 1E for the vibration test of the rotor blade is provided with a jig body 2E holding a fan blade B, bolts (a force applying section) 7 that apply a load to the fan blade B to fix the fan blade B to the jig body 2E, and a top plate 22 constituting the force applying section together with the bolts 7. In this embodiment, a strain gauge embedded type of bolt is adopted as each bolt 7.

The jig body 2E is in a block shape, and a blade mount 2Ea is integrally provided in a center in a right-left direction shown in the drawing. Further, in the top plate 22, a holding groove 22a is formed into which the dovetail portion Br of the fan blade B with the blade tip Bt up is fitted from below.

In this embodiment, the fan blade B with the blade tip Bt up is mounted and held on the blade mount 2Ea. Then, the top plate 22 is set relative to the fan blade B on the blade mount 2Ea so that a dovetail portion Br is fitted into the holding groove 22a of the top plate.

In this case, a plurality of bolts 7 are arranged on opposite sides of the fan blade B on the blade mount 2Ea. Screw portions 7a of the bolts 7 extend through the top plate 22, and are screwed into screw holes 2Eb of the jig body 2E, respectively.

That is, in this state, the plurality of bolts 7 are screwed into the screw holes 2Eb of the jig body 2E, to fix the fan blade B to the jig body 2E while applying a force to the dovetail portion Br of the fan blade B in a direction of an arrow shown in the drawing, that is, applying, to the end portion Br, a surface pressure due to a reaction force received from the top plate 22.

Then, in this embodiment, the jig body 2E to which the fan blade B is fixed as described above is mounted to an excitation table T that vibrates in a horizontal plane of an electromagnetic shaker S, when performing the vibration test for evaluating the high cycle fatigue characteristics.

Also, in this embodiment, in a case of using the excitation table T that vibrates in a vertical direction, the test can be similarly performed by mounting the jig body 2E to the excitation table T so that a blade surface of the fan blade B faces a vibration direction of the excitation table T.

When performing the vibration test for evaluating the high cycle fatigue characteristics of the rotor blade by use of the jig 1E for the vibration test of the rotor blade according to this embodiment, first, the respective screw portions 7a of the plurality of bolts 7 extending through the top plate 22 are screwed into the screw holes 2Eb of the jig body 2E, respectively, on opposite sides of the fan blade B on the blade mount 2Ea of the jig body 2E, so that the load can be applied to the fan blade B.

Secondly, the jig body 2E holding the fan blade B is fixed onto the excitation table T of the electromagnetic shaker S. Subsequently, the bolts 7 on the opposite sides of the fan blade B are further screwed into the screw holes 2Eb of the jig body 2E, respectively, to apply the load equivalent to a centrifugal force in a span direction to the dovetail portion Br of the fan blade B that is fitted into the holding groove 22a of the top plate 22, and thereby, the fan blade B is fixed to the jig body 2E.

Next, when the fan blade B, the bolts 7 and the jig body 2E on the excitation table T are excited collectively in a horizontal direction by the electromagnetic shaker S in a state where the above load is applied to the dovetail portion Br of the fan blade B, the fan blade B may be excited while leaving the load simulating an actual operation state applied onto the dovetail portion Br of the fan blade B.

Also, in the jig 1E for the vibration test of the rotor blade according to this embodiment, the fan blade B may be excited at a large amplitude. Consequently, the rotor blade can be efficiently excited to reach a large deformation region where high cycle fatigue failure occurs.

Also, in the jig 1E for the vibration test of the rotor blade according to this embodiment, the bolts 7 and top plate 22 serving as the force applying section are placed on the jig body 2E, and hence, the jig body 2E serves as an internal force system for the load applied to the dovetail portion Br. As a result, damages on the electromagnetic shaker S and deformation of the excitation table T can be avoided.

Further, in the jig 1E for the vibration test of the rotor blade according to this embodiment, the strain gauge embedded type of bolt that also functions as a load measuring section is adopted as each bolt 7 serving as the force applying section, and hence, it can be confirmed that the load simulating the actual operation state is applied to the dovetail portion Br. Additionally, a sensor for monitoring a blade deformation may be placed on the blade surface of the fan blade B, and hence, the test can be carried out while accurately grasping the deformation of the fan blade B.

Note that conventional bolts may be adopted as the bolts 7 serving as the force applying section, and load cells for the bolts may be used as the load measuring section.

Figure 7:
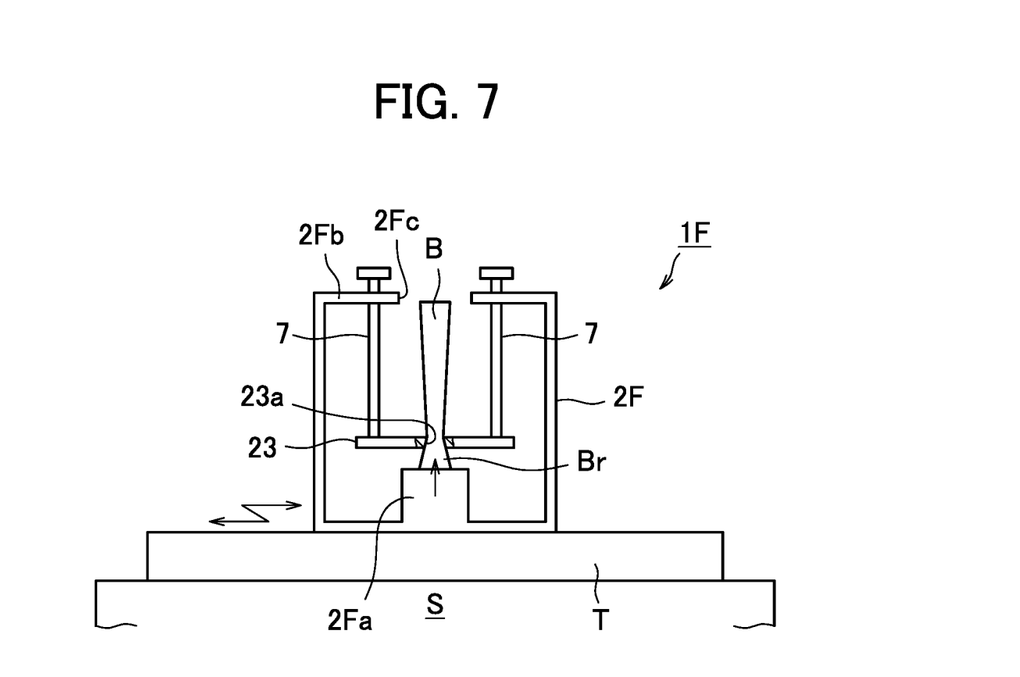
FIG. 7 is a front explanatory view showing a situation where the vibration test of the rotor blade is performed by using a jig for the vibration test of the rotor blade according to a still further embodiment of the present disclosure.

FIG. 7 shows a jig for a vibration test of a rotor blade according to a still further embodiment of the present disclosure. This embodiment also illustrates a case where the jig for the vibration test of the rotor blade according to the present disclosure is for use in the vibration test for evaluating high cycle fatigue characteristics of a fan blade (a fan rotor blade) for an aircraft engine.

As shown in FIG. 7, a jig 1F for the vibration test of the rotor blade is also provided with a jig body 2F holding a fan blade B, and bolts (a force applying section) 7 that apply a load to the fan blade B to fix the fan blade B to the jig body 2F. Also, in this embodiment, a strain gauge embedded type of bolt is adopted as each bolt 7.

The jig body 2F is in a square tube shape surrounded with walls on top, bottom, right and left except front and rear (front and back of the drawing). An opening 2Fc is formed in a top wall 2Fb of the jig body 2F, and a blade mount 2Fa is provided integrally in a bottom part.

Further, in the jig body 2F, a top plate 23 constituting a force applying section together with the bolts 7 is housed. In the top plate 23, a holding groove 23a is formed into which a dovetail portion Br of the fan blade B with a blade tip Bt up is fitted from below.

In this embodiment, the fan blade B is mounted and held on the blade mount 2Fa. Then, the top plate 23 is set relative to the fan blade B on the blade mount 2Fa so that the dovetail portion Br is fitted into the holding groove 23a of the top plate.

A plurality of bolts 7 are arranged on opposite sides of the fan blade B on the blade mount 2Fa in the jig body 2F. The respective bolts 7 extend through the top wall 2Fb, and are screwed into the top plate 23.

That is, in this state, the plurality of bolts 7 are screwed into the top plate 23, to fix the fan blade B to the jig body 2F while applying a force to the dovetail portion Br of the fan blade B in a direction of an arrow shown in the drawing, that is, applying, to the dovetail portion Br, a surface pressure due to a reaction force received from the top plate 23.

Then, in this embodiment, the jig body 2F to which the fan blade B is fixed as described above is mounted to an excitation table T that vibrates in a horizontal plane of an electromagnetic shaker S, when performing the vibration test for evaluating high cycle fatigue characteristics.

Also, in this embodiment, in a case of using the excitation table T that vibrates in a vertical direction, the test can be similarly performed by mounting the jig body 2F to the excitation table T so that a blade surface of the fan blade B faces a vibration direction of the excitation table T.

When performing the vibration test by use of the jig 1F for the vibration test of the rotor blade according to this embodiment, first, the plurality of bolts 7 extending through the top wall 2Fb are screwed into the top plate 23 on opposite sides of the fan blade B on the blade mount 2Fa of the jig body 2F, so that the load can be applied to the fan blade B.

Secondly, the jig body 2F holding the fan blade B is fixed onto the excitation table T of the electromagnetic shaker S. Subsequently, the respective bolts 7 on the opposite sides of the fan blade B are further screwed into the top plate 23, to apply the load equivalent to a centrifugal force in a span direction to the dovetail portion Br of the fan blade B that is fitted into the holding groove 23a of the top plate 23, and thereby, the fan blade B is fixed to the jig body 2F.

Next, when the fan blade B, the bolts 7 and the jig body 2F on the excitation table T are excited collectively in a horizontal direction by the electromagnetic shaker S in a state where the above load is applied to the dovetail portion Br of the fan blade B, the fan blade B may be excited while leaving the load simulating an actual operation state applied onto the dovetail portion Br of the fan blade B.

Also, in the jig 1F for the vibration test of the rotor blade according to this embodiment, the rotor blade can be efficiently excited to reach a large deformation region where high cycle fatigue failure occurs.

Furthermore, since the bolts 7 and top plate 23 serving as the force applying section are placed in the jig body 2F, the jig body 2F serves as an internal force system for the load applied to the dovetail portion Br, and damages on the electromagnetic shaker S and deformation of the excitation table T can be avoided.

Further, in the jig 1F for the vibration test of the rotor blade according to this embodiment, the strain gauge embedded type of bolt that also functions as a load measuring section is adopted as each bolt 7 serving as the force applying section, and hence, it can be confirmed that the load simulating the actual operation state is applied to the dovetail portion Br. Additionally, a sensor for monitoring a blade deformation may be placed on the blade surface of the fan blade B, and hence, the test can be carried out while accurately grasping the deformation of the fan blade B.

Figure 8:
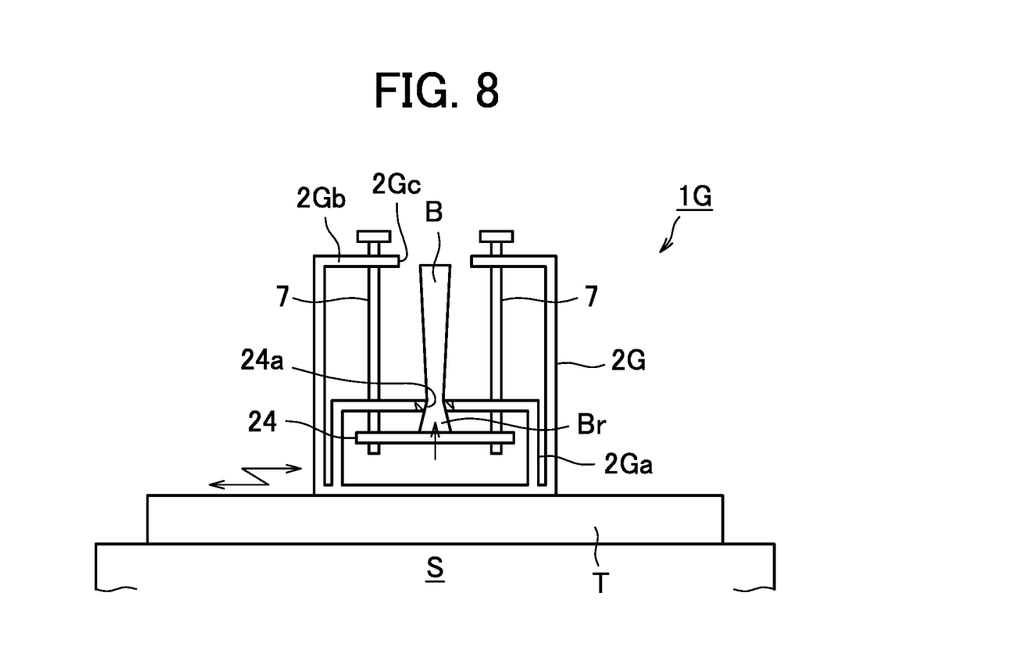
FIG. 8 is a front explanatory view showing a situation where the vibration test of the rotor blade is performed by using a jig for the vibration test of the rotor blade according to a still further embodiment of the present disclosure.

FIG. 8 shows a jig for a vibration test of a rotor blade according to a still further embodiment of the present disclosure. This embodiment also illustrates a case where the jig for the vibration test of the rotor blade according to the present disclosure is for use in the vibration test for evaluating high cycle fatigue characteristics of a fan blade (a fan rotor blade) for an aircraft engine.

As shown in FIG. 8, a jig 1G for the vibration test of the rotor blade is also provided with a jig body 2G holding a fan blade B, and bolts (a force applying section) 7 that apply a load to the fan blade B to fix the fan blade B to the jig body 2G. Also, in this embodiment, a strain gauge embedded type of bolt is adopted as each bolt 7.

The jig body 2G is in a square tube shape surrounded with walls on top, bottom, right and left except front and rear (front and back of the drawing). In this case, an opening 2Gc is formed in a top wall 2Gb of the jig body 2G, and a hollowed top plate mount 2Ga is provided integrally in a bottom part. In a top surface of the top plate mount 2Ga, a holding groove 24a is formed into which a dovetail portion Br of the fan blade B with a blade tip Bt up is fitted from below.

Furthermore, a blade mounting plate 24 constituting the force applying section together with the bolts 7 is housed in the top plate mount 2Ga of the jig body 2G. In this embodiment, the fan blade B is mounted and held on the blade mounting plate 24 so that the dovetail portion Br is fitted into the holding groove 24a of the top plate mount 2Ga.

A plurality of bolts 7 are arranged on opposite sides of the fan blade B on the blade mounting plate 24 in the jig body 2G, respectively. The bolts 7 sequentially extend through the top wall 2Gb and a top surface of the top plate mount 2Ga and are screwed into the blade mounting plate 24.

That is, in this state, the plurality of bolts 7 are screwed into the blade mounting plate 24, to fix the fan blade B to the jig body 2G while applying a force to the dovetail portion Br of the fan blade B in a direction of an arrow shown in the drawing, that is, applying, to the dovetail portion Br, a surface pressure due to a reaction force received from the top surface of the top plate mount 2Ga.

Then, in this embodiment, the jig body 2G to which the fan blade B is fixed as described above is mounted to an excitation table T that vibrates in a horizontal plane of an electromagnetic shaker S, when performing the vibration test for evaluating high cycle fatigue characteristics.

Also, in this embodiment, in a case of using the excitation table T that vibrates in a vertical direction, the test can be similarly performed by mounting the jig body 2G to the excitation table T so that a blade surface of the fan blade B faces a vibration direction of the excitation table T.

When performing the vibration test by use of the jig 1G for the vibration test of the rotor blade according to this embodiment, first, the respective bolts 7 sequentially extending through the top wall 2Gb and the top surface of the top plate mount 2Ga are screwed into the blade mounting plate 24 on opposite sides of the fan blade B on the blade mounting plate 24 of the jig body 2G, so that the load can be applied to the fan blade B.

Secondly, the jig body 2G holding the fan blade B is fixed onto the excitation table T of the electromagnetic shaker S. Subsequently, the respective bolts 7 on the opposite sides of the fan blade B are further screwed into the blade mounting plate 24, to apply the load equivalent to a centrifugal force in a span direction to the dovetail portion Br of the fan blade B that is fitted into the holding groove 24a of the top plate mount 2Ga, and thereby, the fan blade B is fixed to the jig body 2G.

Next, when the fan blade B, the bolts 7 and the jig body 2G on the excitation table T are excited collectively in a horizontal direction by the electromagnetic shaker S in a state where the above load is applied to the dovetail portion Br of the fan blade B, the fan blade B may be excited while leaving the load simulating an actual operation state applied onto the dovetail portion Br of the fan blade B.

Also, in the jig 1G for the vibration test of the rotor blade according to this embodiment, the rotor blade can be efficiently excited to reach a large deformation region where high cycle fatigue failure occurs.

Additionally, since the bolts 7 and blade mounting plate 24 serving as the force applying section are placed in the jig body 2G, the jig body 2G serves as an internal force system for the load applied to the dovetail portion Br, and damages on the electromagnetic shaker S and deformation of the excitation table T can be avoided.

Furthermore, the strain gauge embedded type of bolt that also functions as a load measuring section is adopted as each bolt 7 serving as the force applying section, and hence, it can be confirmed that the load simulating the actual operation state is applied to the dovetail portion Br. Additionally, a sensor for monitoring a blade deformation may be placed on the blade surface of the fan blade B, and hence, the test can be carried out while accurately grasping the deformation of the fan blade B.

Figure 9:
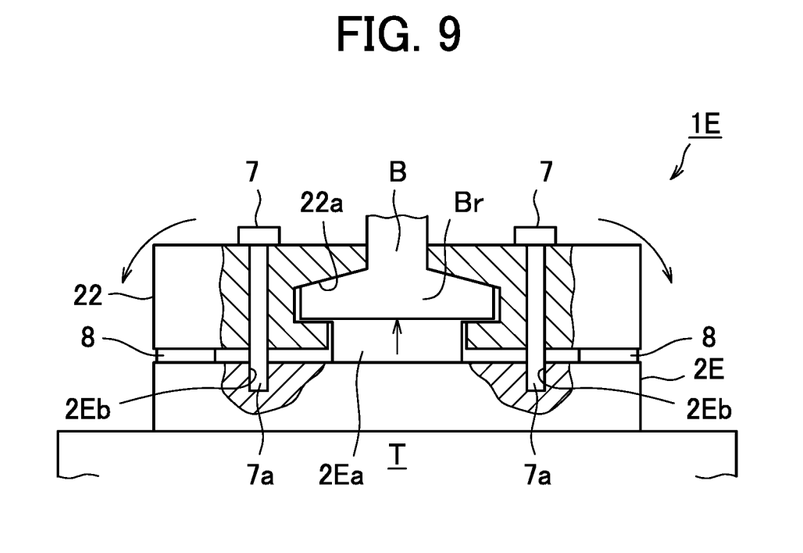
FIG. 9 is a partially cross-sectional partial front explanatory view showing a modification of the jig for the vibration test of the rotor blade in FIG. 6.

FIG. 9 shows a modification of the jig 1E for the vibration test of the rotor blade in the embodiment shown in FIG. 6. In this embodiment, support plates 8 are inserted into spaces between a jig body 2E and a top plate 22 in opposite end portions of the top plate 22 (end portions outside respective bolts 7 arranged on opposite sides of a fan blade B), respectively. The other configuration is the same as in the jig 1E for the vibration test of the rotor blade in the previous embodiment.

In this embodiment, the top plate 22 can be prevented from being bent and deformed in arrow directions by an operation of screwing the bolts 7 inward when applying a load to a dovetail portion Br of the fan blade B.

In this embodiment, as each support plate 8, a load cell may be adopted, or a member to which a strain gauge is attached may be adopted and the support plate may function as a load measuring section.

Note that in this embodiment, the support plates 8 are inserted between the jig body 2E and the top plate 22 in the opposite end portions of the top plate 22, but the present disclosure is not limited to this embodiment. The support plate 8 in at least one of the end portions may be formed integrally with either one of the jig body 2E and the top plate 22, or may include a plurality of members.

Figure 10:
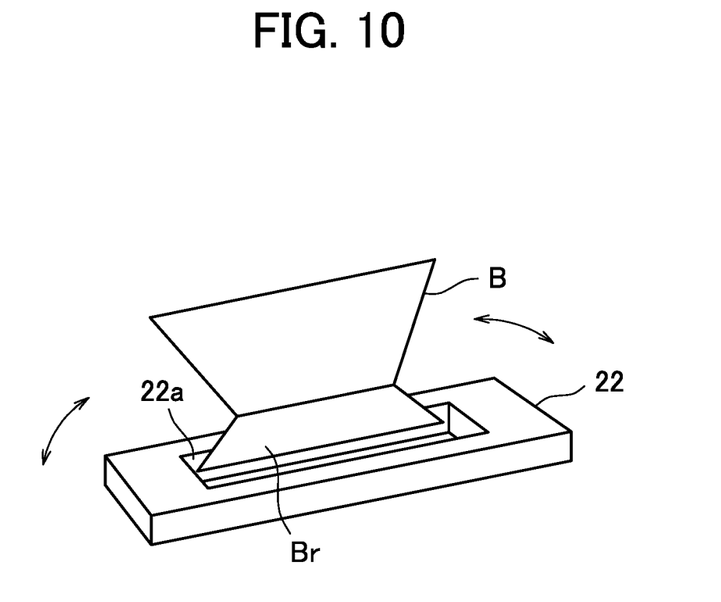
FIG. 10 is an entire perspective explanatory view of a top plate to be adopted in the jig for the vibration test of the rotor blade in FIG. 9.
Figure 11:
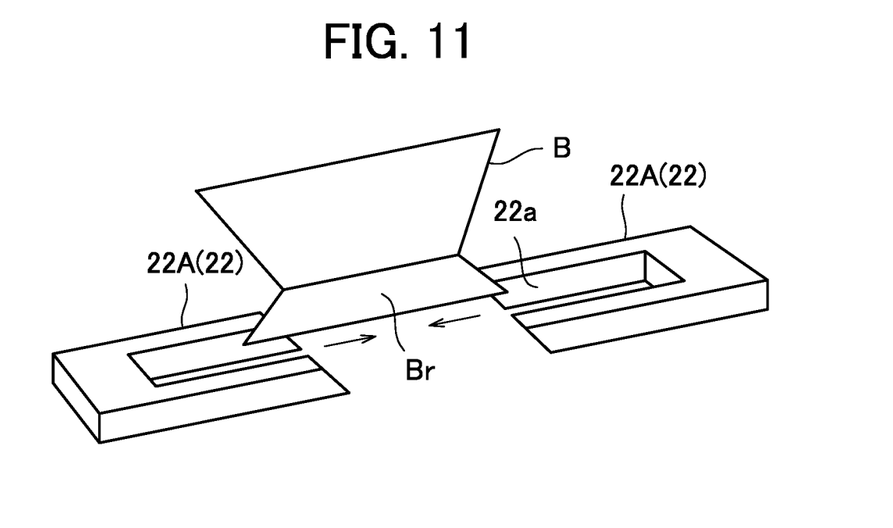
FIG. 11 is an exploded perspective explanatory view showing a modification of a top plate of the jig for the vibration test of the rotor blade in FIG. 10.
Figure 12:
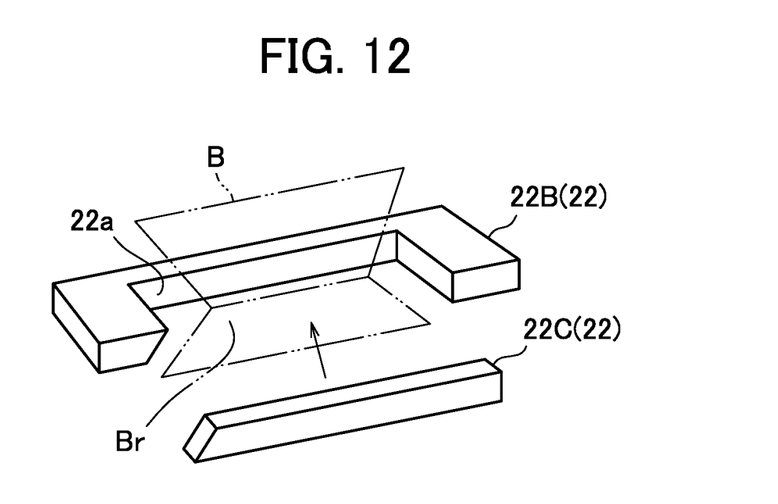
FIG. 12 is an exploded perspective explanatory view showing another modification of the top plate of the jig for the vibration test of the rotor blade in FIG. 10.

FIG. 10 to FIG. 12 show examples of the top plate 22 to be adopted in the jig 1E for the vibration test of the rotor blade in the embodiment shown in FIG. 9.

As shown in FIG. 10, the top plate 22 of one example includes a holding groove 22a opened in a center of a flat surface. In this case, a fan blade B is inserted into the holding groove 22a of the top plate 22 from a dovetail portion Br side, and the dovetail portion Br is placed finally in the holding groove 22a while twisting the top plate 22.

In the top plate 22 according to this example, the holding groove 22a is opened in the center of the flat surface, and hence, high rigidity can be obtained.

Alternatively, as shown in FIG. 11, a top plate 22 of another example is formed of divided pieces 22A, 22A divided into two at a center in a longitudinal direction. In this case, a dovetail portion Br of a fan blade B is sandwiched between the right divided piece 22A and the left divided piece 22A to place the dovetail portion Br in a holding groove 22a.

Furthermore, as shown in FIG. 12, a top plate 22 of still another example is formed of a top plate body 22B with one of two long sides being divided, and a divided piece 22C. In this case, a dovetail portion Br of a fan blade B shown by a virtual line is sandwiched between the top plate body 22B and the divided piece 22C to place the dovetail portion Br in a holding groove 22a.

Since the top plate 22 of the example shown in FIG. 11 (FIG. 12) is formed of two divided pieces 22A, 22A (the top plate body 22B and the divided piece 22C), an operation of holding the dovetail portion Br of the fan blade B with the jig body 2E can be efficiently performed.

Figure 13:
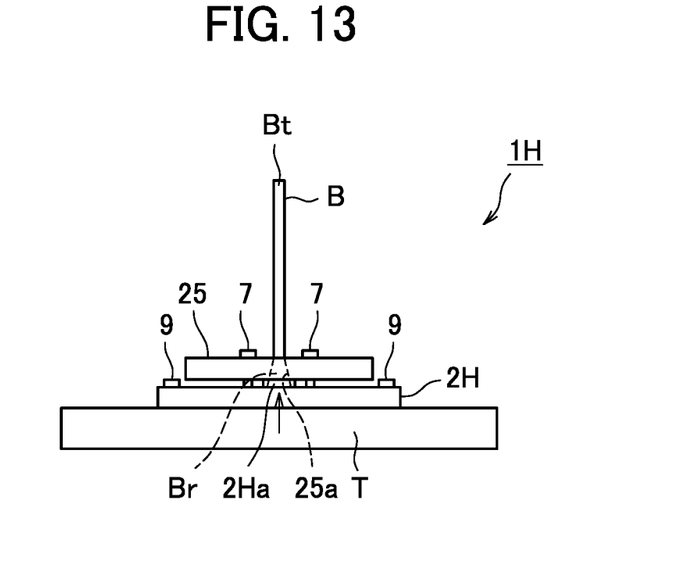
FIG. 13 is a front explanatory view showing a situation where the vibration test of the rotor blade is performed by using a jig for the vibration test of the rotor blade according to a still further embodiment of the present disclosure.
Figure 14:
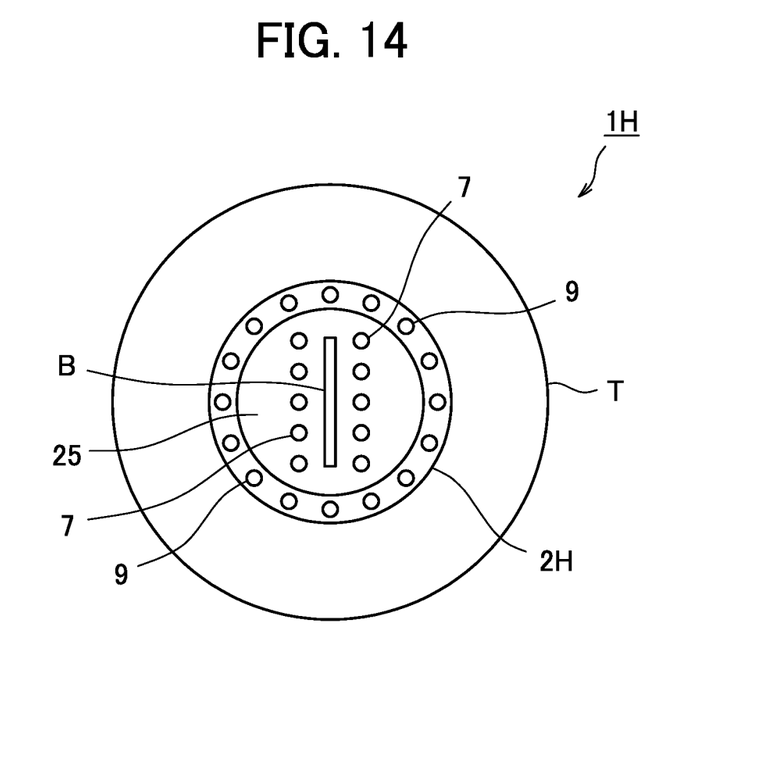
FIG. 14 is a planar explanatory view of the jig for the vibration test of the rotor blade in FIG. 13.

FIG. 13 and FIG. 14 show a jig for a vibration test of a rotor blade according to a still further embodiment of the present disclosure. This embodiment also illustrates a case where the jig for the vibration test of the rotor blade according to the present disclosure is for use in the vibration test for evaluating high cycle fatigue characteristics of a fan blade (a fan rotor blade) for an aircraft engine.

As shown in FIG. 13, a jig 1H for the vibration test of the rotor blade is provided with a jig body 2H holding a fan blade B, bolts (a force applying section) 7 that apply a load to the fan blade B to fix the fan blade B to the jig body 2H, and a top plate 25 constituting the force applying section together with the bolts 7.

As shown in FIG. 14, the jig body 2H is disc-shaped, and provided with a blade mount 2Ha integrally at the center. The top plate 25 is also disc-shaped. In a center of the top plate 25, a holding groove 25a is formed into which a dovetail portion Br of the fan blade B with a blade tip Bt up is fitted from below.

In this embodiment, the fan blade B with the blade tip Bt up is mounted and held on the blade mount 2Ha. Then, the top plate 25 is set relative to the fan blade B on the blade mount 2Ha so that the dovetail portion Br is fitted into the holding groove 25a of the top plate.

In this case, a plurality of bolts 7 are arranged on opposite sides of the fan blade B, respectively. The respective bolts 7 extend through the top plate 25 and are screwed into the jig body 2H. Thus, the bolts 7 are screwed into the jig body 2H, to fix the fan blade B to the jig body 2H, while applying a load to the dovetail portion Br of the fan blade B in a direction of an arrow shown in the drawing.

Then, in this embodiment, bolts 9 are arranged at equal intervals in a circumference of the jig body 2H. Then, the bolts 9 are screwed into an excitation table T that vibrates in a horizontal plane of an electromagnetic shaker S, and thereby, the jig body 2H is fixed to the excitation table T.

That is, a position of the jig body 2H in a circumferential direction can be changed in accordance with a pitch of the bolts 9 on the excitation table T of the electromagnetic shaker S (position adjustment).

Specifically, in a state shown in FIG. 14, that is, in a case where the blade tip Bt of the fan blade B is on a front side in a depth direction shown in the drawing, the dovetail portion Br of the fan blade B is on an inner side in the depth direction shown in the drawing, and an up-down direction shown in the drawing is a longitudinal direction of the dovetail portion Br, the excitation table T is excited in a direction perpendicular to the longitudinal direction of the dovetail portion Br (a right-left direction shown in the drawing), and thereby, a bending mode is mainly excited in the fan blade B.

On the other hand, if the position of the jig body 2H in the circumferential direction on the excitation table T of the electromagnetic shaker S is changed in accordance with the pitch of the bolts 9, a vibration direction by the excitation table T is not perpendicular to the longitudinal direction of the dovetail portion Br, and hence, a twisting mode is mainly excited in the fan blade B.

Therefore, in this embodiment, in addition to excitation of the bending mode, the excitation of the twisting mode in accordance with any shape of the fan blade can also be reproduced.

Note that also, in this embodiment, in a case of using the excitation table T that vibrates in a vertical direction, the test can be similarly performed by mounting the jig body 2H to the excitation table T so that a blade surface of the fan blade B faces the vibration direction of the excitation table T, for example, during the reproduction of the excitation of the bending mode.

When performing the vibration test for evaluating the high cycle fatigue characteristics of the rotor blade by use of the jig 1H for the vibration test of the rotor blade according to this embodiment, first, the plurality of bolts 7 extending through the top plate 25 are screwed into the jig body 2H on the opposite sides of the fan blade B on the blade mount 2Ha of the jig body 2H, respectively, so that the load can be applied to the fan blade B.

Secondly, the bolts 9 in the periphery of the jig body 2H are screwed into the excitation table T of the electromagnetic shaker S, to fix the jig body 2H holding the fan blade B onto the excitation table T. Subsequently, the respective bolts 7 on the opposite sides of the fan blade B are further screwed into a top surface of the jig body 2H, and the load equivalent to a centrifugal force in a span direction is applied to the dovetail portion Br of the fan blade B fitted into the holding groove 25a of the top plate 25, to fix the fan blade B to the jig body 2H.

Next, when the fan blade B, the bolts 7 and the jig body 2H on the excitation table T are excited collectively in a horizontal direction by the electromagnetic shaker S in a state where the above load is applied to the dovetail portion Br of the fan blade B, the fan blade B may be excited while leaving the load simulating an actual operation state applied onto the dovetail portion Br of the fan blade B.

Also, in the jig 1H for the vibration test of the rotor blade according to this embodiment, the rotor blade may be efficiently excited to reach a large deformation region where high cycle fatigue failure occurs.

Additionally, since the bolts 7 and top plate 22 serving as the force applying section are arranged on the jig body 2H, the jig body 2H serves as an internal force system for the load applied to the dovetail portion Br. As a result, damages on the electromagnetic shaker S and deformation of the excitation table T can be avoided.

Furthermore, since the position of the jig body 2H in the circumferential direction can be adjusted in accordance with the pitch of the bolts 9 on the excitation table T of the electromagnetic shaker S, the fan blade B may be excited in a direction other than an out-of-plane direction of the blade surface by adjusting the position of the jig body 2H in the circumferential direction. That is, in addition to the excitation of the bending mode, the excitation of the twisting mode in accordance with any shape of the fan blade can also be reproduced.

Note that in this embodiment, the bolts 9 are arranged at equal intervals in the periphery of the jig body 2H, and here, bolt holes through which the bolts 9 of the jig body 2H extend may be long holes extending in the circumferential direction. In this case, a position of the jig body 2H in a rotation direction can be more precisely adjusted.

The configuration of the jig for the vibration test of the rotor blade according to the present disclosure is not limited to the above described embodiments, and can be variously modified without departing from scope of the disclosure.

A first aspect of the present disclosure is a jig for a vibration test of a rotor blade, for use in the vibration test for evaluating high cycle fatigue characteristics of the rotor blade, and the jig is provided with a jig body holding a dovetail portion of the rotor blade and fixed onto an excitation table of a shaker, and a force applying section that applies a load in a span direction to the dovetail portion of the rotor blade to fix the rotor blade to the jig body.

When performing the vibration test for evaluating the high cycle fatigue characteristics of the rotor blade by use of the jig for the vibration test of the rotor blade of the present disclosure, first, the force applying section is connected to the dovetail portion of the rotor blade held by the jig body, so that the load can be applied.

Secondly, the jig body holding the rotor blade is fixed onto the excitation table of the shaker.

Subsequently, the force applying section applies, to the dovetail portion of the rotor blade, the load equivalent to a centrifugal force in the span direction to fix the rotor blade to the jig body.

Next, when the rotor blade, the force applying section and the jig body on the excitation table are excited collectively by the shaker in a state where the above load is applied to the dovetail portion of the rotor blade by the force applying section, the rotor blade may be excited while leaving the load simulating an actual operation state applied onto the dovetail portion of the rotor blade.

In the jig for the vibration test of the rotor blade according to the first aspect of the present disclosure, the excitation table of the shaker is noticeably excited, and thereby, the rotor blade may be excited at a large amplitude. Consequently, the rotor blade may be efficiently excited to reach a large deformation region where high cycle fatigue failure occurs.

Furthermore, in a second aspect of the present disclosure, the force applying section is placed in the jig body.

In the jig for the vibration test of the rotor blade according to the second aspect of the present disclosure, since the force applying section is placed in the jig body, the jig body serves as an internal force system for the load applied to the dovetail portion. Therefore, damages on the shaker and deformation of the excitation table can be avoided.

Additionally, a third aspect of the present disclosure is provided with a load measuring section that measures the load applied from the force applying section to the dovetail portion of the rotor blade.

Since the jig for the vibration test of the rotor blade according to the third aspect of the present disclosure is provided with the load measuring section that measures the load applied from the force applying section to the dovetail portion, it can be confirmed that the load simulating an actual operation state is applied to the dovetail portion.

Furthermore, a fourth aspect of the present disclosure is provided with a reinforcement part of the jig body.

Since the jig for the vibration test of the rotor blade according to the fourth aspect of the present disclosure is provided with the reinforcement part of the jig body, the jig body can be prevented from being deformed when operating the force applying section in the jig body to apply the load to the dovetail portion of the rotor blade.

Additionally, in a fifth aspect of the present disclosure, the jig body is fixed onto the excitation table of the shaker so that a position of the jig body is adjustable.

In the jig for the vibration test of the rotor blade according to the fifth aspect of the present disclosure, since the position of the jig body can be adjusted on the excitation table of the shaker, the rotor blade can be excited in a direction other than an out-of-plane direction by adjusting the position of the jig body.

EXPLANATION OF REFERENCE SIGNS

1, 1A to 1H jig for a vibration test of a rotor blade
2, 2A to 2H jig body
2Bc, 2Cc rib (a reinforcement part)
3 hydraulic jack (a force applying section)
4 load cell (a load measuring section)
5 reinforcement plate (a reinforcement part)
7 strain gauge embedded bolt (a force applying section, a load measuring section)
21, 22, 23, 25 top plate (a force applying section)
B fan blade (a rotor blade)
Br dovetail portion (a dovetail-shaped blade root end portion)
S shaker
T excitation table

The invention claimed is:

1. A jig for a vibration test of a rotor blade, for use in the vibration test for evaluating high cycle fatigue characteristics of the rotor blade, comprising:
a jig body holding a dovetail portion of the rotor blade and fixed onto an excitation table of a shaker, and
a force applying section that applies a load in a span direction to the dovetail portion of the rotor blade to fix the rotor blade to the jig body, wherein
the force applying section includes a top plate and a plurality of bolts;
in the top plate, a holding groove is formed into which the dovetail portion of the rotor blade with a blade tip up is fitted from below; and
the plurality of bolts are arranged on opposite sides of the rotor blade on the jig body and screw portions of the plurality of bolts extend through the top plate and are screwed into screw holes of the jig body.

2. The jig for the vibration test of the rotor blade according to claim 1, wherein the jig body is fixed onto the excitation table of the shaker so that a position of the jig body is adjustable.

3. The jig for the vibration test of the rotor blade according to claim 1, comprising a load measuring section that measures the load applied from the force applying section to the dovetail portion of the rotor blade, wherein the plurality of bolts are strain gauge embedded type.

4. The jig for the vibration test of the rotor blade according to claim 3, wherein the jig body is fixed onto the excitation table of the shaker so that a position of the jig body is adjustable.

5. The jig for the vibration test of the rotor blade according to claim 1, wherein support plates are inserted into spaces between the jig body and the top plate in opposite end portions of the top plate.

6. The jig for the vibration test of the rotor blade according to claim 5, wherein each of the support plates is a load cell or a strain gauge is attached to each of the support plates.

7. The jig for the vibration test of the rotor blade according to claim 6, wherein the holding groove is opened in a center of a flat surface of the top plate.

8. The jig for the vibration test of the rotor blade according to claim 6, wherein the top plate is formed of pieces divided into two at a center in a longitudinal direction.

9. The jig for the vibration test of the rotor blade according to claim 6, wherein the top plate is formed of a top plate body with one of two long sides being divided, and a divided piece.

\* \* \* \* \*